United States Patent
Hasumi et al.

(10) Patent No.: US 10,150,097 B2
(45) Date of Patent: Dec. 11, 2018

(54) HONEYCOMB ADSORBENT, METHOD OF MANUFACTURING THE HONEYCOMB ADSORBENT AND CANISTER

(71) Applicant: MAHLE FILTER SYSTEMS JAPAN CORPORATION, Tokyo (JP)

(72) Inventors: Takashi Hasumi, Tokyo (JP); Junpei Omichi, Kawagoe (JP); Koji Yamasaki, Saitama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 122 days.

(21) Appl. No.: 15/427,614

(22) Filed: Feb. 8, 2017

(65) Prior Publication Data

US 2018/0178194 A1     Jun. 28, 2018

(30) Foreign Application Priority Data

Dec. 26, 2016   (JP) .................................. 2016-251646

(51) Int. Cl.
*F02M 25/08*     (2006.01)
*B01J 20/28*     (2006.01)
(Continued)

(52) U.S. Cl.
CPC .... *B01J 20/28045* (2013.01); *B01D 53/0407* (2013.01); *B01J 20/0229* (2013.01);
(Continued)

(58) Field of Classification Search
CPC ............. F02M 25/0854; F02M 25/089; F02M 35/10222; B28B 11/243; B28B 3/20; B01J 20/0229; B01J 20/06; B01J 20/20; B01J 20/28011; B01J 20/2803; B01J 20/28045; B01J 20/28071; B01J 20/28085; B01D 53/0407; B01D 2253/102;
(Continued)

(56) References Cited

U.S. PATENT DOCUMENTS 6,540,815 B1   4/2003  Hiltzik et al.
7,789,075 B2 * 9/2010  Makino .............. F02M 25/0854
                                                      123/519

(Continued)

FOREIGN PATENT DOCUMENTS

JP     2005-306710 A     11/2005
JP     2009-019572 A      1/2009

*Primary Examiner* — Frank M Lawrence, Jr.
(74) *Attorney, Agent, or Firm* — Foley & Lardner LLP

(57) ABSTRACT

A cylindrical column-shaped honeycomb adsorbent has a plurality of cell passages extending along an axial direction of the honeycomb adsorbent. The plurality of cell passages are configured so that a pitch of adjacent cell passages is within a range of 1.5 mm~1.8 mm, and so that a thickness of a wall between the cell passages is within a range of 0.45 mm~0.60 mm. With this configuration, the honeycomb adsorbent exhibits BWC (Butane Working Capacity) of 6.5 g/dL or greater. By mixing fibrous meltable core melting away during baking, the honeycomb adsorbent has macropores configured to have a volume of 0.15 mL/g~0.35 mL/g with respect to an overall weight of the honeycomb adsorbent and metal oxide particles having a proportion of weight of 150~250% with respect to the activated carbon.

10 Claims, 6 Drawing Sheets

(51) Int. Cl.
*B01J 20/06* (2006.01)
*B01J 20/20* (2006.01)
*B01D 53/04* (2006.01)
*B01J 20/02* (2006.01)
*B28B 3/20* (2006.01)
*B28B 11/24* (2006.01)
*F02M 35/10* (2006.01)

(52) U.S. Cl.
CPC ............... *B01J 20/06* (2013.01); *B01J 20/20* (2013.01); *B01J 20/2803* (2013.01); *B01J 20/28011* (2013.01); *B01J 20/28071* (2013.01); *B01J 20/28085* (2013.01); *B28B 3/20* (2013.01); *B28B 11/243* (2013.01); *F02M 25/089* (2013.01); *F02M 25/0854* (2013.01); *F02M 35/10222* (2013.01); *B01D 2253/102* (2013.01); *B01D 2253/1124* (2013.01); *B01D 2253/25* (2013.01); *B01D 2253/34* (2013.01); *B01D 2253/3425* (2013.01); *B01D 2257/702* (2013.01); *B01D 2259/4516* (2013.01)

(58) Field of Classification Search
CPC ........ B01D 2253/1124; B01D 2253/25; B01D 2253/34; B01D 2253/3425; B01D 2257/702; B01D 2259/4516
USPC ................... 96/108, 121, 147, 153; 95/146; 123/519; 502/417, 527.19
See application file for complete search history.

(56) References Cited

U.S. PATENT DOCUMENTS 8,015,965 B2 9/2011 Yamasaki
8,360,034 B2 1/2013 Yamasaki
8,443,786 B2 5/2013 Yamasaki

* cited by examiner

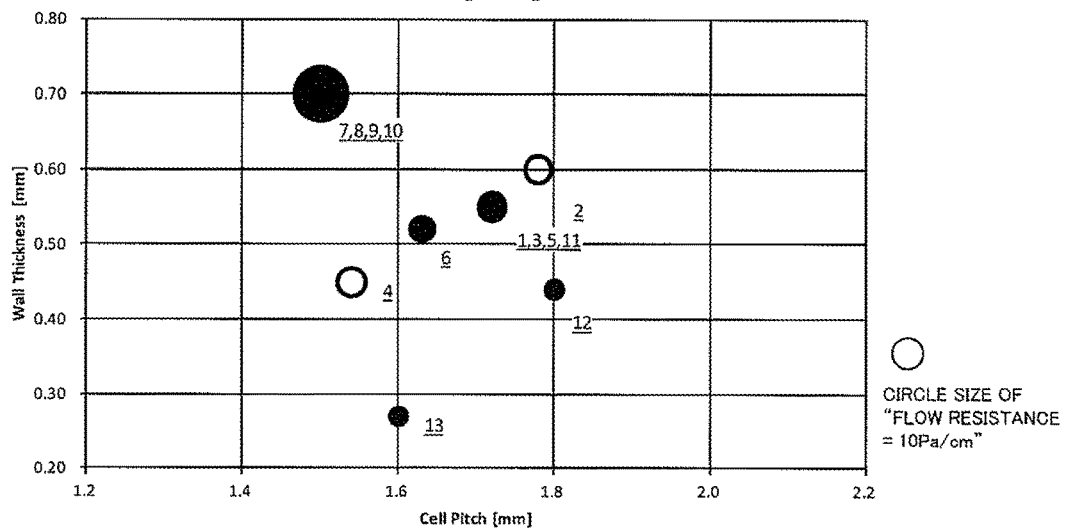
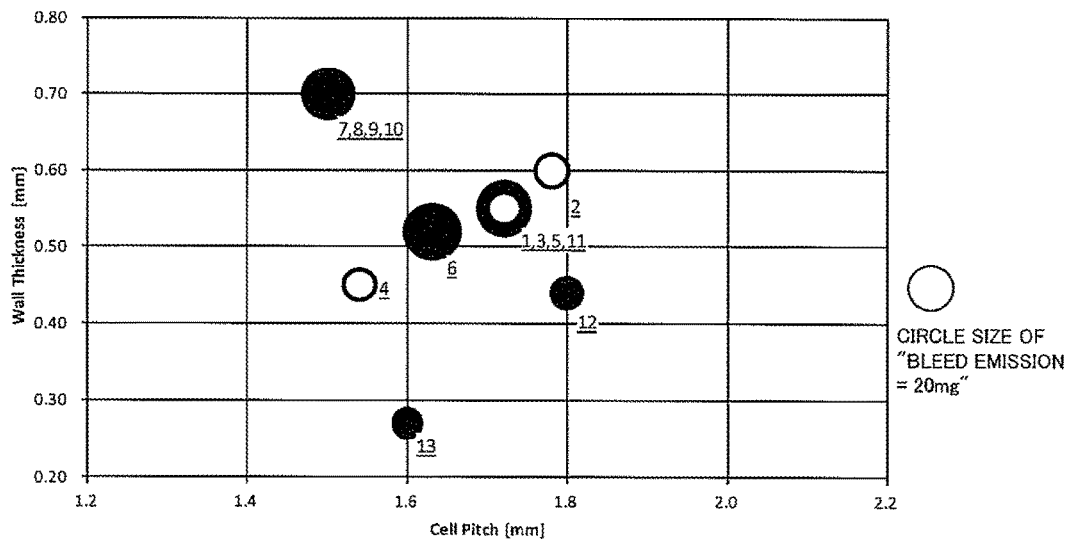

COMPOSITION AMOUNT OF NYLON FIBER [g] (with respect to 100g of ACTIVATED CARBON)

COMPOSITION AMOUNT OF METALLIC OXIDE [g] (with respect to 100g of ACTIVATED CARBON)

HONEYCOMB ADSORBENT, METHOD OF MANUFACTURING THE HONEYCOMB ADSORBENT AND CANISTER

BACKGROUND OF THE INVENTION

The present invention relates to a honeycomb adsorbent molded from powdery activated carbon, as an adsorbent used for, for instance, a treatment of fuel vapor of an internal combustion engine of a vehicle, and a method of manufacturing the honeycomb adsorbent, and also relates to a canister having the honeycomb adsorbent.

For instance, for an internal combustion engine of a vehicle, in order to prevent release of fuel vapor evaporated from a fuel tank of the vehicle into the outside, a canister that is capable of adsorbing and desorbing the fuel vapor is provided. The canister temporarily adsorbs the fuel vapor that is generated after a vehicle stop etc., and desorbs an adsorbed fuel component by an air flow during a drive, then the fuel component is burned in the internal combustion engine.

The canister has a casing, a charge port and a purge port which are disposed at one end of a flow passage formed by the casing and also has a drain port which is disposed at the other end of the flow passage. The canister is configured so that during the purge, atmospheric air is introduced into the casing from the drain port.

Here, in recent years, emission requirement (or emission control) has required reduction in a leak of the fuel component that slightly leaks from the drain port as time progresses in a vehicle stop state, i.e. reduction in the leak of so-called bleed emission. As a bleed emission test, for instance, a DBL (Diurnal Breathing Loss) test is provided.

Reduction in an adsorption residual amount on a drain port side in the canister is effective in suppressing. the bleed emission from the drain port.

U.S. Pat. No. 6,540,815 (hereinafter is referred to as "U.S. Pat. No. 6,540,815") discloses that, in order to reduce the adsorption residual amount on the drain port side, activated carbon whose adsorption capacity (e.g. BWC (Butane Working Capacity)) is low is arranged in an adsorbent chamber on the drain port side in the canister. Further, U.S. Pat. No. 6,540,815 discloses that the canister uses a honeycomb adsorbent formed by extruding activated carbon into a honeycomb shape.

Japanese Unexamined Patent Application No. 2009-019572 (hereinafter is referred to as "JP2009-019572") discloses that a cross-sectional area of a passage of an adsorbent chamber on a drain port side in a canister is set to be small, and large-grained macroporous activated carbon is arranged in this adsorbent chamber.

Japanese Unexamined Patent Application No. 2005-306710 (hereinafter is referred to as "JP2005-306710") discloses a configuration using a honeycomb adsorbent as a sub-canister connected to a drain port of a main canister. In particular, in JP2005-306710, by setting a thickness of a partition wall of the honeycomb adsorbent to 0.35 mm or thinner, a rate of a cell opening area becomes large, and a pressure loss is suppressed.

SUMMARY OF THE INVENTION

For the honeycomb adsorbent disposed in the adsorbent chamber on the drain port side in the canister, increasing desorption efficiency by forming the thickness of the partition wall of the honeycomb adsorbent thin as disclosed in JP2005-306710 is effective in reducing the adsorption residual amount with the aim of reducing the bleed emission. When the thickness of the partition wall is formed thin then the rate of the cell opening area becomes large, a flow resistance lowers at the same time.

However, if the thickness of the partition wall is formed thin in order to increase the desorption efficiency, the BWC lowers at the same time. Therefore, in a case where an amount of the fuel component diffusing from an adsorbent chamber on a charge port side is large, a large-sized honeycomb adsorbent is necessary to prevent the leak of this fuel component.

That is to say, for the honeycomb adsorbent located on the drain port side, the following elements; reducing the bleed emission, ensuring the BWC and lowering the flow resistance, are important. However, although the above three elements are important, it is difficult to satisfy these three elements.

The present invention was made in view of the above technical problem. An object of the present invention is therefore to provide a honeycomb adsorbent, a method of manufacturing the honeycomb adsorbent and a canister having the honeycomb adsorbent, which can satisfy the three elements.

According to one aspect of the present invention, a honeycomb adsorbent having a cylindrical column shape, formed by molding and baking powdery activated carbon together with binder and installed in a closest chamber to a drain port of a canister having a plurality of chambers, comprises: a plurality of cell passages extending along an axial direction of the honeycomb adsorbent; macropores formed with fibrous meltable core melting away during the baking, the macropores being configured to have a volume of 0.15 mL/g~0.35 mL/g with respect to an overall weight of the honeycomb adsorbent; and metal oxide particles having a proportion of weight of 150~250% with respect to the activated carbon. And, the plurality of cell passages being configured so that a pitch of adjacent cell passages is within a range of 1.5 mm~1.8 mm, and so that a thickness of a wall between the cell passages is within a range of 0.45 mm~0.60 mm, and the honeycomb adsorbent being configured to exhibit BWC (Butane Working Capacity) of 6.5 g/dL or greater.

The powdery activated carbon inherently has micropores (microscopic pores) and mesopores (mesoscopic pores). With regard to macropores (macroscopic pores), by adding the fibrous meltable core when molding the powdery activated carbon together with the binder, macropores having even larger pore sizes are formed. The micropore is defined as a pore whose diameter is less than 2 nm. The mesopore is defined as a pore whose diameter is equal to or greater than 2 nm and less than 50 nm. The macropore is defined as a pore whose diameter is equal to or greater than 50 nm and less than 1000 nm. The macropores of the present invention are thin pores according to a shape of the fibrous meltable core. Presence of these macropores contributes to increase in the desorption efficiency.

The metal oxide particles increase specific gravity of the whole adsorbent, and increase heat capacity by high specific heat. With these properties, thermal conversion of the adsorbent when adsorbing and desorbing the fuel vapor is gentle or sluggish, thereby enhancing the adsorption efficiency and the desorption efficiency. With respect to the metal oxide particles, as compared with other metal particles, the metal oxide particles do not change in a manufacturing process of the honeycomb adsorbent. Further, the metal oxide particles do not inhibit the adsorption and the desorption. Moreover, as advantages, the metal oxide particles have a high affinity for clay as the binder for retaining a shape of the honeycomb adsorbent without reducing strength of the honeycomb adsorbent.

Therefore, by presence of the macropores and the metal oxide particles, even if the wall between the cell passages is relatively thick, a residual amount of the fuel component in the honeycomb adsorbent disposed in a position closest to the drain port is deceased in the DBL test, and the bleed emission is greatly reduced. The thickness of the wall between the cell passages of the honeycomb adsorbent of the present invention is greater than that of a well-known honeycomb adsorbent, while the pitch of the cell passage is smaller than that of the well-known honeycomb adsorbent. With this structure, the bleed emission is reduced without excessively increasing the flow resistance.

Further, since the honeycomb adsorbent has the BWC of 6.5 g/dL. or greater, it is possible to surely prevent the leak of the fuel component diffusing from the adsorbent chamber on the charge port side.

As a preferable embodiment, an occupation ratio that is determined by outside dimensions of the honeycomb adsorbent and dimensions of the cell passages is at least 50%. The occupation ratio is defined or determined by subtracting a volume of the cell passages from an apparent outside volume based on outside dimensions of the honeycomb adsorbent and by dividing this subtraction value by the apparent outside volume. That is, the occupation ratio indicates a ratio at which adsorbent material except the cell passages is present.

A shape in a cross-section of the cell passage is any one of a hexagon, a quadrangle, a triangle and a circle, preferably, the hexagon.

As the metal oxide, iron oxide ($Fe_2O_3$) and magnesium oxide (MgO) etc. can be used. Iron oxide is preferable in terms of specific gravity and specific heat.

A canister having the honeycomb adsorbent of the present invention could be further provided with at least an additional adsorbent, for instance, in the chamber arranged on the charge port side.

According to another aspect of the present invention, a method of manufacturing a honeycomb adsorbent for a canister, comprising: making mixture as mold material by adding, to powdery activated carbon, metal oxide particles having a proportion of weight of 150~250% with respect to the activated carbon, meltable core made of fiber whose specific gravity is 1.1 g/cm$^3$~1.3 g/cm$^3$ and having a proportion of weight of 40~100% with respect to the activated carbon, the meltable core melting away during baking, and binder; extruding the mold material into a cylindrical column-shaped intermediate mold body having therein a plurality of honeycomb cell passages, the plurality of cell passages being configured so that a pitch of adjacent cell passages is within a range of 1.5 mm~1.8 mm and so that a thickness of a wall between the cell passages is within a range of 0.45 mm~0.60 mm after the baking; and baking the intermediate mold body, the baked intermediate mold body of the honeycomb adsorbent exhibiting BWC (Butane Working Capacity) of 6.5 g/dL or greater.

As the fiber forming the meltable core, it is preferable to use polyimide resin fiber or polyester resin fiber.

The fiber forming the meltable core has a diameter of 10 µm and a length of 1 mm or shorter, preferably, a length of 0.5 mm.

According to the present invention, as a honeycomb adsorbent favorable to the adsorbent chamber on the drain port side in the canister, the honeycomb adsorbent that is capable of simultaneously satisfying the three elements; the reduction in the bleed emission, ensuring of the BWC and lowering of the flow resistance, can be provided.

The other objects and features of this invention will become understood from the following description with reference to the accompanying drawings.

BRIEF DESCRIPTION OF THE DRAWINGS

FIG. 5 is a bubble chart showing a relationship between the pitch P of the cell passage, the wall thickness T and a flow resistance.

FIG. 6 is a bubble chart showing a relationship between the pitch P of the cell passage, the wall thickness T and bleed emission.

DETAILED DESCRIPTION OF THE INVENTION

Figure 1:
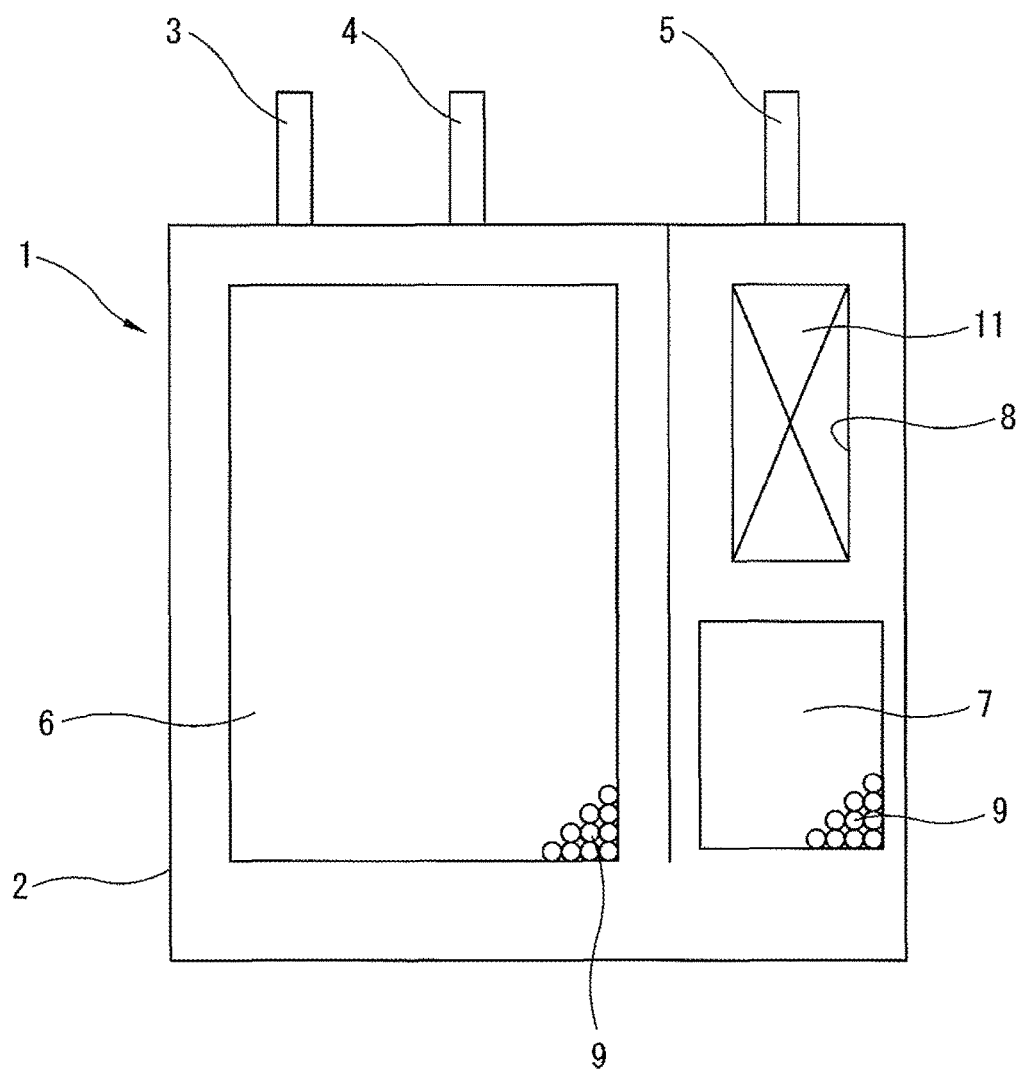
FIG. 1 is a schematic diagram showing an example of a canister.

FIG. 1 shows an example of a canister 1 employing a honeycomb adsorbent 11 of the present invention. This canister 1 is a canister in which a flow passage is formed into a U-turn shape by a synthetic resin-made casing 2. A charge port 3 that is an inflow portion of fuel vapor and a purge port 4 that is an outflow portion of the fuel vapor are provided at one end, in a flow direction, of the casing 2. A drain port 5 that is an air release opening is provided at the other end, in the flow direction, of the casing 2. The charge port 3 is connected to, for instance, a fuel tank (not shown) of a vehicle, while the purge port 4 is connected to, for instance, an intake system of an internal combustion engine. The drain port 5 is configured to be open directly to the atmospheric air. However, the drain port 5 could be provided with any valve mechanism.

In the casing 2, a plurality of adsorbent chambers are provided along the flow direction. For instance, a first chamber 6, a second chamber 7 and a third chamber 8 are arranged in series. The first chamber 6 and the second chamber 7 are filled with granular adsorbent 9 made of granular molded activated carbon or crushed or pulverized activated carbon. The granular adsorbent 9 in the first chamber 6 and the granular adsorbent 9 in the second chamber 7 could be the same adsorbent or may be a different adsorbent. As an example, the granular adsorbent 9 in the first chamber 6 has micropores (microscopic pores) and mesopores (mesoscopic pores) which the activated carbon itself has, but does not actively have macropores (macroscopic pores) formed by meltable core. On the other hand, the granular adsorbent 9 in the second chamber 7 has the macropores formed by the meltable core.

The honeycomb adsorbent 11 of the present invention is molded into a cylindrical column shape, and installed in the third chamber 8 that is a closest chamber to the drain port 5. The first chamber 6, the second chamber 7 and the third chamber 8 are each divided by, for instance, a porous plate or a filter which is permeable to the air. Here, a plurality of third chambers 8 could be arranged parallel to each other, and each third chamber 8 could be provided with the honeycomb adsorbent 11.

Figure 2:
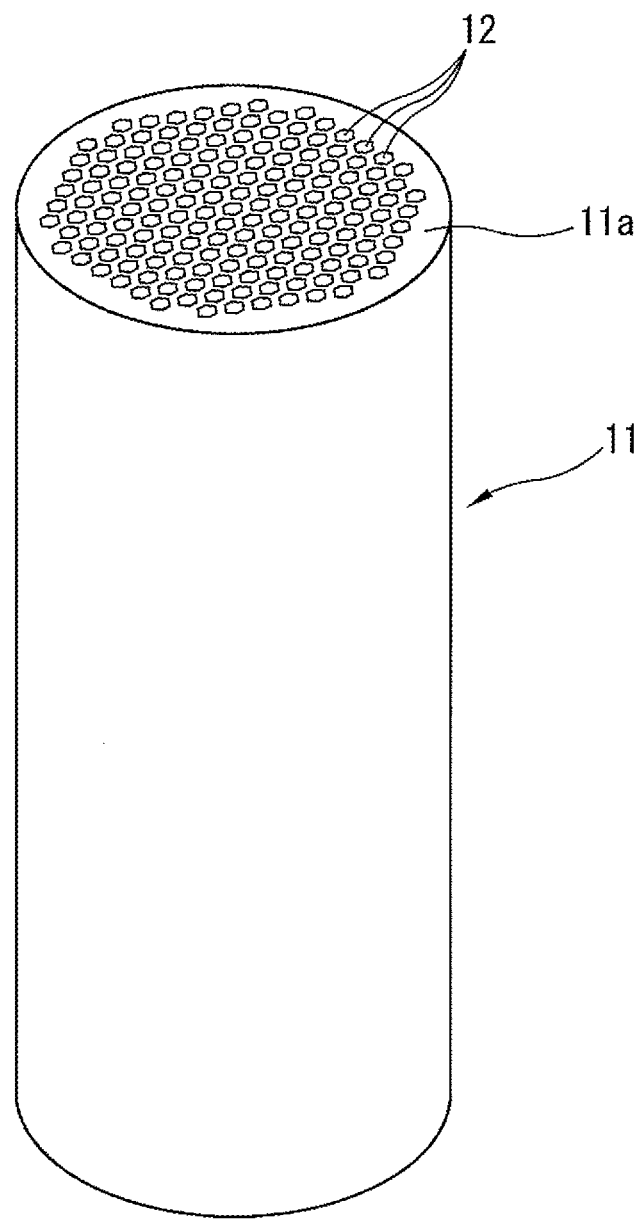
FIG. 2 is a perspective view showing an embodiment of a honeycomb adsorbent.
Figure 3:
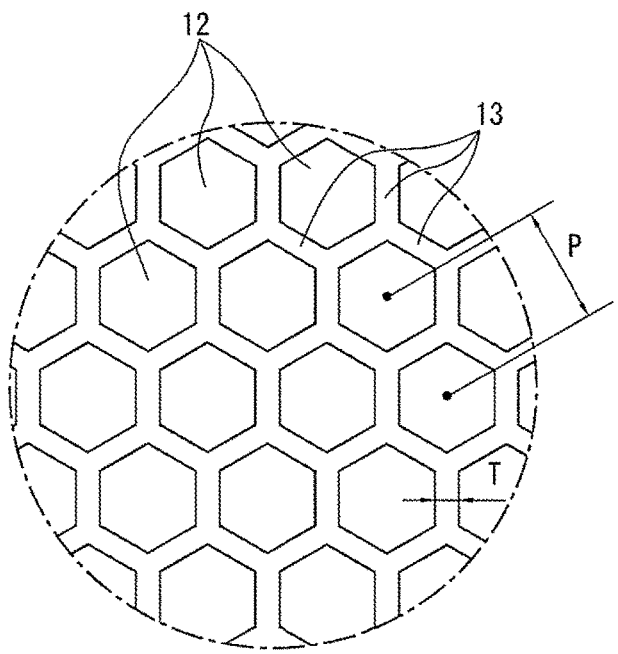
FIG. 3 is a top view showing a structure of a cell passage of the honeycomb adsorbent.

FIG. 2 shows an embodiment of the cylindrical column-shaped honeycomb adsorbent 11. The honeycomb adsorbent 11 has a plurality of cell passages 12 extending along an axial direction of the cylindrical column shape. These cell passages 12 are open on an end surface 11a of the honeycomb adsorbent 11, in other word, these cell passages 12 penetrate the honeycomb adsorbent 11 along the axial direction. In this example, as shown in FIG. 3, a cross section of each cell passage 12 is a regular hexagon, and a wall 13 having a uniform thickness for defining each cell passage 12 is provided between adjacent cell passages 12. As can be seen in FIG. 3, a pitch P between the adjacent cell passages 12 is defined by a distance between two center points of adjacent two regular hexagons. Further, a thickness T of the wall 13 is defined as a length or a distance of a direction orthogonal to each wall surface.

The honeycomb adsorbent 11 and a method of manufacturing the honeycomb adsorbent 11 will be explained below.

First, powdery activated carbon of 300 g, preferably powdery activated carbon whose grain diameter (grain size) is 100 μm or less of 300 g and as meltable core that forms macropores, synthetic resin short fiber (preferably polyamide resin fiber or polyester resin fiber) whose fiber diameter is 10 μm and whose fiber length is 1 mm or less of 120 g to 300 g are mixed together with these powdery activated carbon and short resin fiber being dried.

By mixing the powdery activated carbon and the short resin fiber in the dried state, dispersibility of each of the powdery activated carbon and the short resin fiber is increased.

Subsequently, as binder, at least one of powdery bentonite, knot clay, silica sol and alumina sal of 120 g to 200 g, as shape-retaining agent upon molding, a proper amount of methyl cellulose, and powdery metallic oxide (powdery metal oxide or metal oxide particles) (preferably, for instance, iron oxide or magnesium oxide) (whose grain diameter (grain size or particle diameter) is substantially 10 μm) of 450 g to 750 g are added to the mixture of the powdery activated carbon and the short resin fiber, and are further mixed together.

Water is added to this mixture as necessary, and mold material (material to be molded) for extrusion molding is prepared. The mold material is extruded (extrusion-molded) into a cylindrical column whose circular cross section has a diameter of approx. 20 mm to 40 mm and which has therein the plurality of regular-hexagonal cell passages 12, by performing the extrusion molding. Further, by cutting this extrusion-molded material to an arbitrary length such as 50 mm to 200 mm, a cylindrical column-shaped intermediate mold body is obtained.

Finally, the cylindrical column-shaped intermediate mold body is baked at 650° C.~1000° C. under a deoxygenation atmosphere using a belt-type electric furnace, then the honeycomb adsorbent 11 is obtained. A shape of cross section of the extrusion-molded material upon extrusion molding (in other words, a shape of a mold) is set so that after the baking, the pitch P of the adjacent cell passages 12 is within a range of 1.5 mm~1.8 mm and the thickness T of the wall 13 between the cell passages 12 is within a range of 0.45 mm~0.60 mm.

The honeycomb adsorbent 11 of the present invention formed in this manner has a relatively large wall thickness T and a relatively small pitch P, as compared with a well-known honeycomb adsorbent that is disposed in a position closest to the drain port in the canister with the aim of reducing the bleed emission. Further, as a structural feature, an occupation ratio that is a ratio at which adsorbent material occupies the honeycomb adsorbent 11 having a honeycomb structure is relatively high. This occupation ratio is, for instance, 50% or more. With this structural feature, the following three elements; reduction in the bleed emission, ensuring of the sufficient BWC and the lower flow resistance, can be satisfied at the same time.

Next, specific embodiments of the honeycomb adsorbent 11 will be explained below.

Embodiment 1

Compositions of the mold material are as follows; 100 parts by weight of powdery activated carbon (grain diameter (grain size) is 100 μm or less), 40 parts by weight of nylon fiber (fiber diameter is 10 μm, fiber length is 0.5 mm), 67 parts by weight of binder (bentonite) and 250 parts by weight of powdery iron oxide. This mold material was extruded (extrusion-molded) into the cylindrical column having therein the honeycomb structure shown in FIG. 2, and was baked. Here, specific gravity of the nylon fiber (polyamide resin fiber) that becomes the meltable core is 1.1 g/cm$^3$.

The honeycomb adsorbent 11 obtained after the baking is a cylindrical column having a 30 mm diameter and a 75 mm length. Further, the pitch P of the adjacent cell passages 12 is 1.7 mm and the thickness T of the wall 13 is 0.55 mm. Weight ratio of the metallic oxide (the iron oxide) after the baking is 60 wt %. An amount of the macropores (a volume of the macropores that occupies a unit weight of the honeycomb adsorbent 11) formed by the meltable core (the nylon fiber) disappearing (or melting away) during the baking is 0.18 mL/g. The volume of the macropores can be measured by, for instance, a method of mercury penetration provided by "ISO 15901-1".

The occupation ratio that is the ratio at which adsorbent material occupies the honeycomb adsorbent 11 having the honeycomb structure is geometrically determined from outside dimensions of the honeycomb adsorbent 11, a size of the cell passage 12 and the number of the cell passages 12. This occupation ratio is 54% in the embodiment 1.

The BWC and the flow resistance of the honeycomb adsorbent 11 obtained in this manner was measured.

Measurement of the BWC was carried out pursuant to ASTM D5228. A measurement result of the BWC is 7.3 g/dL.

Regarding the flow resistance, a pressure difference between front and rear (top and bottom) of the honeycomb adsorbent 11 (not assembled in the canister) is measured by flowing gas, then by dividing this pressure difference by a length of the honeycomb adsorbent 11, flow resistance [Pa/cm] per unit length is determined. Further, by dividing a flow amount at the measurement by a cross-sectional area of the honeycomb adsorbent 11, a line flow velocity (a line air velocity) [cm/s] is determined, then a flow resistance per unit length at 100 cm/s is determined. The result is 8.2 Pa/cm. A target flow resistance of the present invention is 10 Pa/cm in order to secure a flow of gas during the charge and the purge in the canister 1.

Further, a test similar to a DBL test was carried out with the honeycomb adsorbent 11 of the embodiment 1 installed in a test canister 1 as shown in FIG. 1, and an amount of the bleed emission (an amount of leak of the fuel component leaking from the drain port 5) was measured. The result is 14 mg. With respect to the test canister 1, the first chamber 6 is filled with 1.9 L of granulated activated carbon whose diameter is approx. 2 mm, the second chamber 7 is filled with 0.1 L of granulated activated carbon that has different properties from the activated carbon of the first chamber 6, and the honeycomb adsorbent 11 is installed in the third chamber 8.

As a method of test, after a predetermined amount of the fuel component evaporated from the charge port 3 flows in the canister 1, the purge is performed by a purging air of a predetermined air amount and a predetermined air velocity. This adsorbing and desorbing cycle are repeated several times to stabilize an adsorption/desorption amount. Next, butane is introduced in the canister 1 through the charge port 3, and is adsorbed to the adsorbent. Then, the canister 1 is left as it is until a temperature of the adsorbent becomes constant. After the temperature of the adsorbent becomes constant, the purge is performed, and the canister 1 is further left as it is half-day. Subsequently, the canister 1 is connected to a fuel tank of a vehicle, and the bleed emission is measured with temperature changed while simulating an outside air temperature. The amount of the bleed emission is an amount obtained by detecting a concentration of hydrocarbon contained in the gas exhausted or emitted from the drain port 5 and converting this concentration of the hydrocarbon into a weight.

A target bleed emission amount of the present invention is 20 mg in accordance with a new regulation enacted in North America which specifies a legal limit of a canister in itself.

As explained above, the honeycomb adsorbent 11 of the present invention can reduce the bleed emission to 20 mg or less that is the target of the present invention, and at the same time, the honeycomb adsorbent 11 can reduce the flow resistance to 10 Pa/cm or less that is the target of the present invention. Further, as mentioned above, since the BWC is 7.3 g/dL, a relatively high BWC value can be ensured. Moreover, as described above, the occupation ratio is relatively high and its value is 54%. Therefore, adsorbing capacity per apparent unit volume with reference to the outside dimensions of the honeycomb adsorbent 11 can be high, thereby effectively suppressing the leak of the fuel component from the drain port 5 by the small-sized honeycomb adsorbent 11.

Embodiment 2

In an embodiment 2, as compared with the embodiment 1, a composition ratio (or a mixing ratio) of the nylon fiber that becomes the meltable core, a composition ratio of the iron oxide, the pitch P of the cell passage 12 and the thickness T of the wall 13 are changed. The other dimensions and ratios are the same as those of the embodiment 1.

Compositions of the mold material are as follows; 100 parts by weight of powdery activated carbon, 43 parts by weight of nylon fiber, 67 parts by weight of binder and 233 parts by weight of powdery iron oxide.

The pitch P of the cell passage 12 after the baking is 1.8 mm and the thickness T of the wall 13 after the baking is 0.6 mm. Further, the weight ratio of the iron oxide after the baking is 58 wt %. The amount of the macropores is 0.15 mL/g, and the occupation ratio is 56%.

The same measurement of the honeycomb adsorbent 11 as that of the embodiment 1 was carried out. The BWC is 7.8 g/dL, the flow resistance is 7.5 Pa/cm, and the amount of the bleed emission is 15 mg.

Embodiment 3

In an embodiment 3, as compared with the embodiment 1, a composition ratio of the nylon fiber that becomes the meltable core is doubled, and a composition ratio of the iron oxide is changed. The other dimensions and ratios are the same as those of the embodiment 1.

Compositions of the mold material are as follows; 100 parts by weight of powdery activated carbon, 85 parts by weight of nylon fiber, 67 parts by weight of binder and 233 parts by weight of powdery iron oxide.

The pitch P of the cell passage 12 after the baking is 1.7 mm and the thickness T of the wall 13 after the baking is 0.55 mm. Further, the weight ratio of the iron oxide after the baking is 58 wt %. The amount of the macropores is 0.35 mL/g, and the occupation ratio is 54%.

The same measurement of the honeycomb adsorbent 11 as that of the embodiment 1 was carried out. The BWC is 6.6 g/dL, the flow resistance is 8.0 Pa/cm, and the amount of the bleed emission is 15 mg.

Embodiment 4

In an embodiment 4, as compared with the embodiment 1, a composition ratio of the iron oxide is reduced, a composition ratio of the binder, the pitch P of the cell passage 12 and the thickness T of the wall 13 are changed. The other dimensions and ratios are the same as those of the embodiment 1.

Compositions of the mold material are as follows; 100 parts by weight of powdery activated carbon, 40 parts by weight of nylon fiber, 40 parts by weight of binder and 150 parts by weight of powdery iron oxide.

The pitch P of the cell passage 12 after the baking is 1.5 mm and the thickness T of the wall 13 after the baking is 0.45 mm. Further, the weight ratio of the iron oxide after the baking is 50 wt %. The amount of the macropores is 0.20 mL/g, and the occupation ratio is 50%.

The same measurement of the honeycomb adsorbent 11 as that of the embodiment 1 was carried out. The BWC is 7.6 g/dL, the flow resistance is 8.3 Pa/cm, and the amount of the bleed emission is 13 mg.

Embodiment 5

In an embodiment 5, as compared with the embodiment 1, as the fiber that becomes the meltable core, polyester resin fiber is used. Further, a composition ratio of the iron oxide is changed. The other dimensions and ratios are the same as those of the embodiment 1.

Compositions of the mold material are as follows; 100 parts by weight of powdery activated carbon, 45 parts by weight of polyester resin fiber, 67 parts by weight of binder and 233 parts by weight of powdery iron oxide. Here, specific gravity of the polyester resin fiber that becomes the meltable core is 1.3 g/cm$^3$.

The pitch P of the cell passage 12 after the baking is 1.7 mm and the thickness T of the wall 13 after the baking is 0.55 mm. Further, the weight ratio of the iron oxide after the baking is 58 wt %. The amount of the macropores is 0.21 mL/g, and the occupation ratio is 54%.

The same measurement of the honeycomb adsorbent 11 as that of the embodiment 1 was carried out. The BWC is 7.1 g/dL, the flow resistance is 8.2 Pa/cm, and the amount of the bleed emission is 14 mg.

As comparative examples, several honeycomb adsorbents 11 were produced, and the same test (measurement) was performed.

Comparative Example 6

Compositions of the mold material of a comparative example 6 are as follows; 100 parts by weight of powdery activated carbon, 86 parts by weight of nylon fiber, 134 parts by weight of binder and 466 parts by weight of powdery iron oxide.

The pitch P of the cell passage 12 after the baking is 1.6 mm and the thickness T of the wall 13 after the baking is 0.52 mm. Further, the weight ratio of the iron oxide after the baking is 67 wt %. The amount of the macropores is 0.28 mL/g, and the occupation ratio is 54%.

The same measurement of the honeycomb adsorbent 11 as that of the embodiment 1 was carried out. The BWC is 5.2 g/dL, the flow resistance is 8.4 Pa/cm, and the amount of the bleed emission is 47 mg. Therefore, the BWC and the bleed emission amount do not meet the respective target values.

Comparative Example 7

Compositions of the mold material of a comparative example 7 are as follows; 100 parts by weight of powdery activated carbon, 22 parts by weight of nylon fiber and 75 parts by weight of binder. The metallic oxide is not added.

The pitch P of the cell passage 12 after the baking is 1.5 mm and the thickness T of the wall 13 after the baking is 0.70 mm. The amount of the macropores is 0.41 mL/g, and the occupation ratio is 72%.

The same measurement of the honeycomb adsorbent 11 as that of the embodiment 1 was carried out. The BWC is 8.2 g/dL, the flow resistance is 35.5 Pa/cm, and the amount of the bleed emission is 30 mg. Therefore, the flow resistance and the bleed emission amount do not meet the respective target values.

Comparative Example 8

Compositions of the mold material of a comparative example 8 are as follows; 100 parts by weight of powdery activated carbon, 22 parts by weight of nylon fiber, 35 parts by weight of binder and 40 parts by weight of powdery iron oxide.

The pitch P of the cell passage 12 after the baking is 1.5 mm and the thickness T of the wall 13 after the baking is 0.70 mm. Further, the weight ratio of the iron oxide after the baking is 23 wt %. The amount of the macropores is 0.40 mL/g, and the occupation ratio is 72%.

The same measurement of the honeycomb adsorbent 11 as that of the embodiment 1 was carried out. The BWC is 7.8 g/dL, the flow resistance is 35.5 Pa/cm, and the amount of the bleed emission is 25 mg. Therefore, the flow resistance and the bleed emission amount do not meet the respective target values.

Comparative Example 9

Compositions of the mold material of a comparative example 9 are as follows; 100 parts by weight of powdery activated carbon, 40 parts by weight of nylon fiber, 63 parts by weight of binder and 423 parts by weight of powdery iron oxide.

The pitch P of the cell passage 12 after the baking is 1.5 mm and the thickness T of the wall 13 after the baking is 0.70 mm. Further, the weight ratio of the iron oxide after the baking is 72 wt %. The amount of the macropores is 0.10 mL/g, and the occupation ratio is 72%.

The same measurement of the honeycomb adsorbent 11 as that of the embodiment 1 was carried out. The BWC is 6.5 g/dL, the flow resistance is 35.5 Pa/cm, and the amount of the bleed emission is 20 mg. Therefore, the flow resistance does not meet the target value.

Comparative Example 10

Compositions of the mold material of a comparative example 10 are as follows; 100 parts by weight of powdery activated carbon, 120 parts by weight of binder and 240 parts by weight of powdery iron oxide. The nylon fiber that becomes the meltable core is not added.

The pitch P of the cell passage 12 after the baking is 1.5 mm and the thickness T of the wall 13 after the baking is 0.70 mm. Further, the weight ratio of the iron oxide after the baking is 52 wt %. The amount of the macropores is 0.08 mL/g, and the occupation ratio is 72%.

The same measurement of the honeycomb adsorbent 11 as that of the embodiment 1 was carried out. The BWC is 7.8 g/dL, the flow resistance is 35.5 Pa/cm, and the amount of the bleed emission is 40 mg. Therefore, the flow resistance and the bleed emission amount do not meet the respective target values.

Comparative Example 11

Compositions of the mold material of a comparative example 11 are as follows; 100 parts by weight of powdery activated carbon, 170 parts by weight of nylon fiber, 67 parts by weight of binder and 233 parts by weight of powdery iron oxide.

The pitch P of the cell passage 12 after the baking is 1.7 mm and the thickness T of the wall 13 after the baking is 0.55 mm. Further, the weight ratio of the iron oxide after the baking is 58 wt %. The amount of the macropores is 0.58 mL/g, and the occupation ratio is 54%.

The same measurement of the honeycomb adsorbent 11 as that of the embodiment 1 was carried out. The BWC is 6.3 g/dL, the flow resistance is 8.6 Pa/cm, and the amount of the bleed emission is 45 mg. Therefore, the BWC and the bleed emission amount do not meet the respective target values.

Comparative Example 12

Compositions of the mold material of a comparative example 12 are as follows; 100 parts by weight of powdery activated carbon, 43 parts by weight of nylon fiber, 67 parts by weight of binder and 233 parts by weight of powdery iron oxide.

The pitch P of the cell passage 12 after the baking is 1.8 mm and the thickness T of the wall 13 after the baking is 0.44 mm. Further, the weight ratio of the iron oxide after the baking is 58 wt %. The amount of the macropores is 0.18 mL/g, and the occupation ratio is 43%.

The same measurement of the honeycomb adsorbent 11 as that of the embodiment 1 was carried out. The BWC is 5.3 g/dL, the flow resistance is 5.4 Pa/cm, and the amount of the bleed emission is 16 mg. Therefore, the BWC does not meet the target value.

Comparative Example 13

Compositions of the mold material of a comparative example 13 are as follows; 100 parts by weight of powdery activated carbon and 400 parts by weight of binder. The nylon fiber and the metallic oxide are not added.

The pitch P of the cell passage 12 after the baking is 1.6 mm and the thickness T of the wall 13 after the baking is 0.27 mm. The amount of the micropores is 0.05 mL/g, and the occupation ratio is 31%.

The same measurement of the honeycomb adsorbent 11 as that of the embodiment 1 was carried out. The BWC is 4.7 g/dL, the flow resistance is 5.3 Pa/cm, and the amount of the bleed emission is 14 mg. Therefore, the BWC does not meet the target value.

A measurement result of the embodiment 1 to 5 and the comparative examples 6 to 13 are shown in Table 1.

Figure 4:
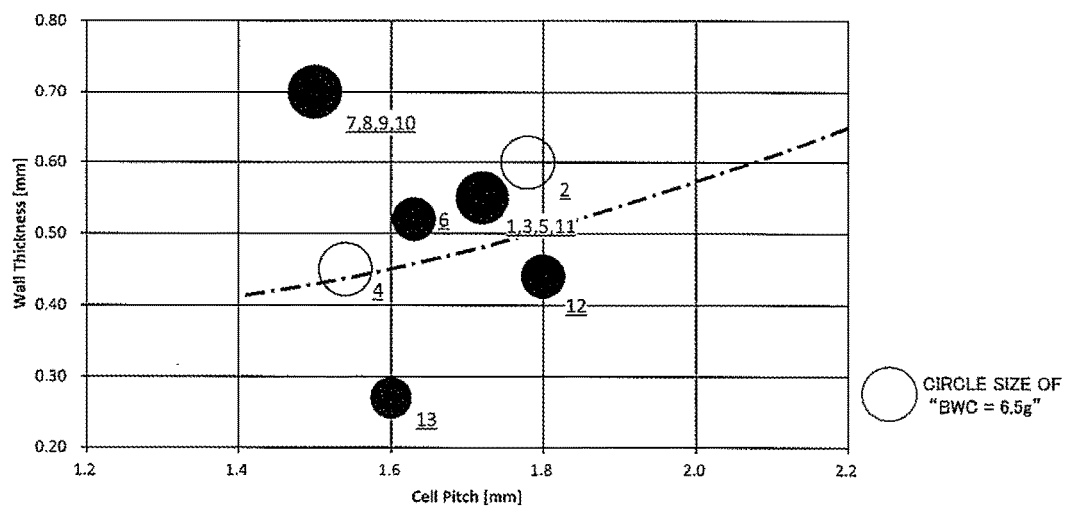
FIG. 4 is a bubble chart showing a relationship between a pitch P of the cell passage, a thickness T of a wall and a value of BWC (Butane Working Capacity).

Next, FIG. 4 shows a bubble chart showing a relationship between the pitch P of the cell passage 12, the thickness T of the wall 13 and a value of BWC (Butane Working Capacity) of samples of the above embodiments 1 to 5 and comparative examples 6 to 13. Here, a circle size indicates a magnitude of the BWC. A number added at a lower right side of the circle corresponds to a number of each sample of the embodiments 1 to 5 and the comparative examples 6 to 13. In FIG. 4, the larger the circle size, the sample has a better BWC.

Likewise, FIG. 5 shows a bubble chart showing a relationship between the pitch P of the cell passage 12, the thickness T of the wall 13 and the flow resistance of the samples of the embodiments 1 to 5 and the comparative examples 6 to 13. Here, a circle size indicates a magnitude of the flow resistance. In FIG. 5, the smaller the circle size, the sample has a better flow resistance.

Likewise, FIG. 6 shows a bubble chart showing a relationship between the pitch P of the cell passage 12, the thickness T of the wall 13 and the bleed emission of the samples of the embodiments 1 to 5 and the comparative examples 6 to 13. In FIG. 6, the smaller the circle size, the sample has a better bleed emission.

As shown in FIG. 5, regarding the flow resistance, the smaller (thinner) the wall thickness T or the greater the pitch P, the smaller the flow resistance is. Here, the smaller (thinner) the wall thickness T or the greater the pitch P, the lower the occupation ratio is.

With regard to the bleed emission, if the wall thickness T is thinner, since an adsorption residual amount decreases, the adsorbent has the advantage of reducing the bleed emission.

However, as shown in FIG. 4, regarding the BWC, as a general tendency, the greater (thicker) the wall thickness T or the smaller the pitch P, the higher the BWC is. Therefore, in the case of the comparative examples 12 and 13 in which the wall thickness T is small (thin) with respect to the pitch P, a sufficient BWC cannot be ensured. Here, a dashed line in FIG. 4 defines an area of the wall thickness T by which the BWC will be 6.5 g/dL or greater that is a target BWC. On the other hand, in the case of the comparative examples 7, 8, 9 and 10 in which the wall thickness T is great (thick) with respect to the pitch P, while the BWC can be ensured, the flow resistance increases as a matter of course. In addition, the amount of the bleed emission increases.

Figure 7:
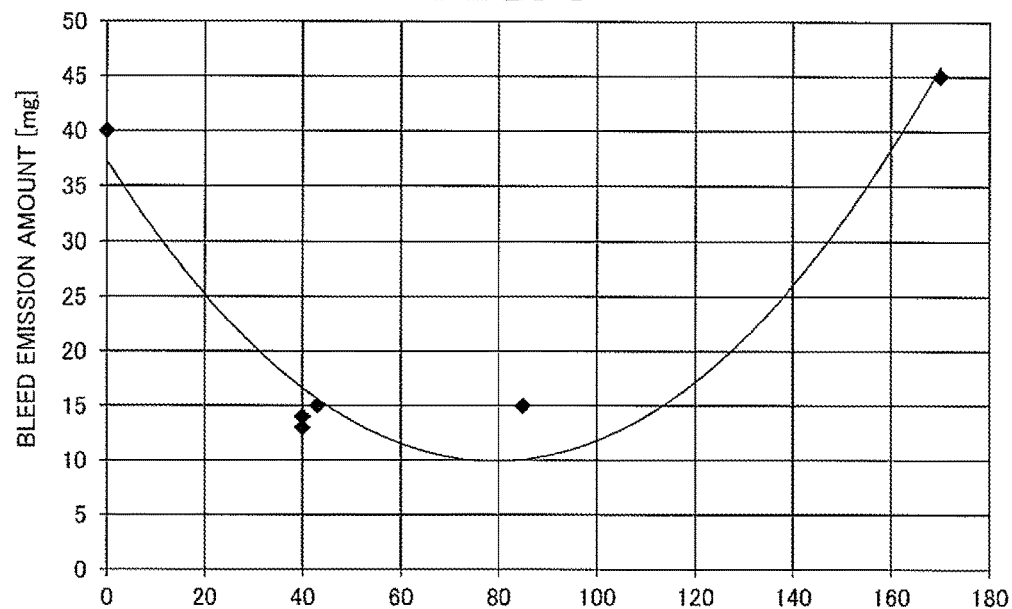
FIG. 7 is a graph showing a relationship between a mixing amount of nylon fiber and an amount of the bleed emission.

FIG. 7 shows a graph showing a relationship between a composition amount (a mixing amount) of the nylon fiber that becomes the meltable core (a weight of the nylon fiber with respect to 100 g of the activated carbon) and an amount of the bleed emission of the samples of the embodiments 1 to 4 and the comparative examples 10 and 11. This graph indicates that even if the amount of the meltable core is extremely large with respect to the activated carbon or the amount of the meltable core is extremely small with respect to the activated carbon, the bleed emission becomes worse. And, this graph indicates that if the amount of the meltable core is within a proper or right range, the bleed emission is reduced.

Figure 8:
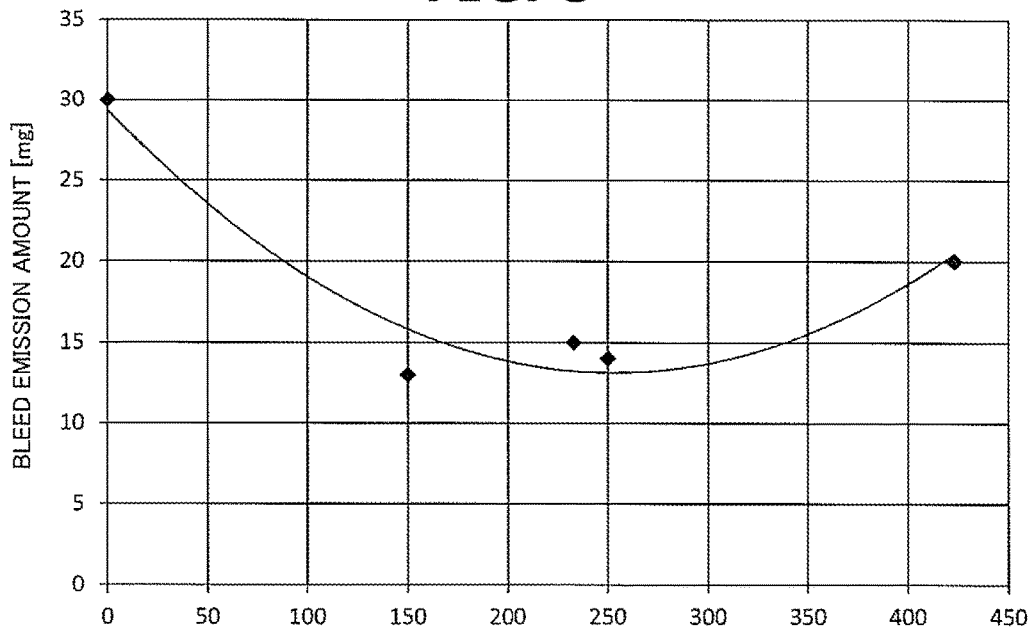
FIG. 8 is a graph showing a relationship between a mixing amount of metallic oxide (metal oxide) and the bleed emission amount.

FIG. 8 shows a graph showing a relationship between a composition amount (a mixing amount) of the metallic oxide (the iron oxide) (a weight of the metallic oxide with respect to 100 g of the activated carbon) and the bleed emission amount of the samples of the embodiments 1 to 4 and the comparative examples 7 and 9. This graph indicates that even if the amount of the metallic oxide is extremely large or the amount of the metallic oxide is extremely small, the bleed emission becomes worse. And, this graph indicates that if the amount of the metallic oxide is within a proper or right range, the bleed emission is reduced.

Figure 9:
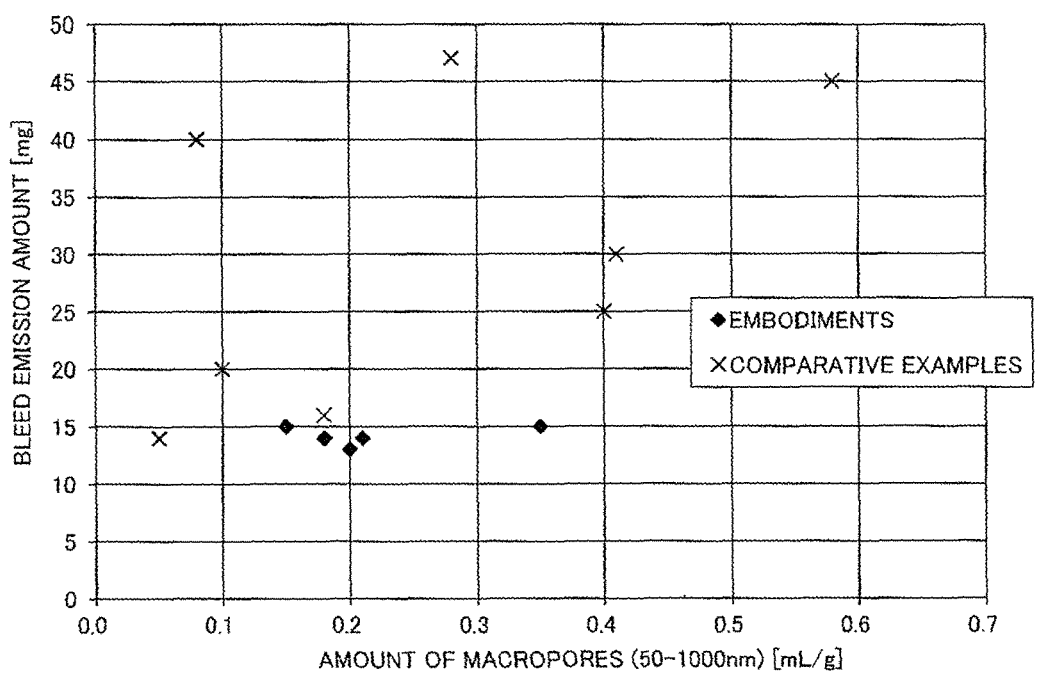
FIG. 9 is a graph showing a relationship between an amount of macropores and the bleed emission amount.

FIG. 9 shows a graph showing a relationship between an amount of the macropores and the bleed emission amount of the samples of the embodiments 1 to 5 and the comparative examples 6 to 13. According to this graph shown in FIG. 9, it is obvious that in order to reduce the bleed emission, a certain amount of the macropores is necessary within a proper or right range. Further, it is obvious that the bleed emission amount is not determined by only the amount of the macropores (the bleed emission amount does not depend on the amount of the macropores).

Hence, by adjusting the amount of the macropores and the amount of the metallic oxide to within respective certain ranges and further by properly setting the relationship between the pitch P of the cell passage 12 and the thickness T of the wall 13, the three elements; reduction in the bleed emission, ensuring of the sufficient BWC and the lower flow resistance, can be satisfied at the same time.

The entire contents of Japanese Patent Application No. 2016-251646 filed on Dec. 26, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

TABLE 1

| | | MELTABLE CORE | | BINDER (CLAY) | METALLIC OXIDE | | HONEYCOMB cell | |
|---|---|---|---|---|---|---|---|---|
| SAMPLE | ACTIVATED CARBON parts by weight | MATERIAL | COMPOSITION RATIO parts by weight | COMPOSITION RATIO parts by weight | COMPOSITION RATIO parts by weight | WEIGHT RATIO AFTER BAKING (wt %) | cell pitch (mm) | wall thickness (mm) |
| EMBODIMENTS 1 | 100 | NYLON FIBER | 40 | 67 | 250 | 60 | 1.7 | 0.55 |
| 2 | 100 | NYLON FIBER | 43 | 67 | 233 | 58 | 1.8 | 0.60 |
| 3 | 100 | NYLON FIBER | 85 | 67 | 233 | 58 | 1.7 | 0.55 |
| 4 | 100 | NYLON FIBER | 40 | 40 | 150 | 50 | 1.5 | 0.45 |
| 5 | 100 | POLYESTER FIBER | 45 | 67 | 233 | 58 | 1.7 | 0.55 |
| COMPARATIVE EXAMPLES 6 | 100 | NYLON FIBER | 86 | 134 | 466 | 67 | 1.6 | 0.52 |
| 7 | 100 | NYLON FIBER | 22 | 75 | 0 | 0 | 1.5 | 0.70 |
| 8 | 100 | NYLON FIBER | 22 | 35 | 40 | 23 | 1.5 | 0.70 |
| 9 | 100 | NYLON FIBER | 40 | 63 | 423 | 72 | 1.5 | 0.70 |
| 10 | 100 | NYLON FIBER | 0 | 120 | 240 | 52 | 1.5 | 0.70 |
| 11 | 100 | NYLON FIBER | 170 | 67 | 233 | 58 | 1.7 | 0.55 |
| 12 | 100 | NYLON FIBER | 43 | 67 | 233 | 58 | 1.8 | 0.44 |
| 13 | 100 | NYLON FIBER | 0 | 400 | 0 | 0 | 1.6 | 0.27 |

| SAMPLE | | AMOUNT OF MACROPORES 50-1000 nm (mL/g) | ADSORPTION CAPACITY BWC (g/dL) | OCCUPATION RATIO | FLOW RESISTANCE at 100 cm/s (Pa/cm) | BLEED EMISSION (mg) |
|---|---|---|---|---|---|---|
| EMBODIMENTS | 1 | 0.18 | 7.3 | 54% | 8.2 | 14 |
| | 2 | 0.15 | 7.8 | 56% | 7.5 | 15 |
| | 3 | 0.35 | 6.6 | 54% | 8.0 | 15 |
| | 4 | 0.20 | 7.6 | 50% | 8.3 | 13 |
| | 5 | 0.21 | 7.1 | 54% | 8.2 | 14 |
| COMPARATIVE EXAMPLES | 6 | 0.28 | 5.2 | 54% | 8.4 | 47 |
| | 7 | 0.41 | 8.2 | 72% | 35.5 | 30 |
| | 8 | 0.40 | 7.8 | 72% | 35.5 | 25 |
| | 9 | 0.10 | 6.5 | 72% | 35.5 | 20 |
| | 10 | 0.08 | 7.8 | 72% | 35.5 | 40 |
| | 11 | 0.58 | 6.3 | 54% | 8.6 | 45 |
| | 12 | 0.18 | 5.3 | 43% | 5.4 | 16 |
| | 13 | 0.05 | 4.7 | 31% | 5.3 | 14 |

What is claimed is:

1. A honeycomb adsorbent having a cylindrical column shape, the honeycomb adsorbent formed by molding and baking powdery activated carbon together with binder and installed in a closest chamber to a drain port of a canister having a plurality of chambers, the honeycomb adsorbent comprising:
   a plurality of cell passages extending along an axial direction of the honeycomb adsorbent;
   macropores formed with fibrous meltable core melting away during the baking, the macropores being configured to have a volume of 0.15 mL/g~0.35 mL/g with respect to an overall weight of the honeycomb adsorbent; and
   metal oxide particles having a proportion of weight of 150~250% with respect to the activated carbon, and
   the plurality of cell passages being configured so that a pitch of adjacent cell passages is within a range of 1.5 mm~1.8 mm, and so that a thickness of a wall between the cell passages is within a range of 0.45 mm~0.60 mm, and
   the honeycomb adsorbent being configured to exhibit BWC (Butane Working Capacity) of 6.5 g/dL or greater.

2. The honeycomb adsorbent as claimed in claim 1, wherein:
   an occupation ratio that is determined by outside dimensions of the honeycomb adsorbent and dimensions of the cell passages is at least 50%.

3. The honeycomb adsorbent as claimed in claim 1, wherein:
   a shape in a cross-section of the cell passage is any one of a hexagon, a quadrangle, a triangle and a circle.

4. The honeycomb adsorbent as claimed in claim 3, wherein:
   the shape in the cross-section of the cell passage is the hexagon.

5. The honeycomb adsorbent as claimed in claim 1, wherein:
   the metal oxide particles are iron oxide particles.

6. A canister having the honeycomb adsorbent as claimed in claim 1.

7. The canister as claimed in claim 6, further comprising:
   at least an additional adsorbent.

8. A method of manufacturing a honeycomb adsorbent for a canister, comprising:
   making mixture as mold material by adding, to powdery activated carbon, metal oxide particles having a proportion of weight of 150~250% with respect to the activated carbon, meltable core made of fiber whose specific gravity is 1.1 g/cm$^3$~1.3 g/cm$^3$ and having a proportion of weight of 40~100% with respect to the activated carbon, the meltable core melting away during baking, and binder;

extruding the mold material into a cylindrical column-shaped intermediate mold body having therein a plurality of honeycomb cell passages, the plurality of cell passages being configured so that a pitch of adjacent cell passages is within a range of 1.5 mm~1.8 mm and so that a thickness of a wall between the cell passages is within a range of 0.45 mm~0.60 mm after the baking; and baking the intermediate mold body, the baked intermediate mold body of the honeycomb adsorbent exhibiting BWC (Butane Working Capacity) of 6.5 g/dL or greater.

9. The method of manufacturing the honeycomb adsorbent for the canister as claimed in claim 8, wherein:

the fiber forming the meltable core is polyamide resin fiber or polyester resin fiber.

10. The method of manufacturing the honeycomb adsorbent for the canister as claimed in claim 8, wherein:

the fiber forming the meltable core has a diameter of 10 μm and a length of 0.5 mm.

* * * * *